(12) United States Patent
Beigman Klebanov et al.

(10) Patent No.: US 11,151,894 B1
(45) Date of Patent: Oct. 19, 2021

(54) SYSTEMS AND METHODS FOR SCORING ARGUMENT CRITIQUE WRITTEN ESSAYS

(71) Applicant: Educational Testing Service, Princeton, NJ (US)

(72) Inventors: Beata Beigman Klebanov, Hopewell, NJ (US); Binod Gyawali, Lawrenceville, NJ (US)

(73) Assignee: Educational Testing Service, Princeton, NJ (US)

( * ) Notice: Subject to any disclaimer, the term of this patent is extended or adjusted under 35 U.S.C. 154(b) by 410 days.

(21) Appl. No.: 15/886,906

(22) Filed: Feb. 2, 2018

Related U.S. Application Data (60) Provisional application No. 62/453,762, filed on Feb. 2, 2017.

(51) Int. Cl.
| | | |
|---|---|---|
| *G09B 7/02* | (2006.01) | |
| *G06F 40/35* | (2020.01) | |
| *G06F 40/253* | (2020.01) | |
| *G06F 40/289* | (2020.01) | |

(52) U.S. Cl.
CPC ............. *G09B 7/02* (2013.01); *G06F 40/253* (2020.01); *G06F 40/289* (2020.01); *G06F 40/35* (2020.01)

(58) Field of Classification Search
CPC ......... G09B 7/02; G06F 40/253; G06F 40/35; G06F 40/289
See application file for complete search history.

(56) References Cited

U.S. PATENT DOCUMENTS

| | | | |
|---|---|---|---|
| 6,366,759 B1* | 4/2002 | Burstein | G09B 7/00 382/321 |
| 2003/0138758 A1* | 7/2003 | Burstein | G09B 7/02 434/169 |
| 2004/0175687 A1* | 9/2004 | Burstein | G06F 40/20 434/353 |
| 2006/0172276 A1* | 8/2006 | Higgins | G09B 7/00 434/362 |
| 2006/0240390 A1* | 10/2006 | Attali | G09B 7/02 434/156 |
| 2009/0226872 A1* | 9/2009 | Gunther | G09B 7/00 434/350 |
| 2011/0185291 A1* | 7/2011 | Miller | G06Q 10/10 715/753 |

(Continued)

OTHER PUBLICATIONS

Burstein et al., Finding the Write Stuff: Automatic Identification of Discourse Structure, 2003, IEEE Computer Society, pp. 32-39 (Year: 2003).*

(Continued)

*Primary Examiner* — Nathan Hillery
(74) *Attorney, Agent, or Firm* — Jones Day (57) ABSTRACT

Methods and systems for scoring an argument critique written essay, including identifying a discourse segment of the argument critique written essay, determining a position of each sentence in the discourse segment, classifying sentences into discourse units, evaluating an argumentative content of each sentence, and assigning an argumentative score to the essay based on the argumentative content of each sentence in the discourse segment of that essay. Methods and systems for training the scoring method are also disclosed. Corresponding apparatuses, systems, and methods are also disclosed.

20 Claims, 7 Drawing Sheets

| | Discourse Transition Feature | | | Weight |
|---|---|---|---|---|
| | Previous | Current | Next | |
| 1 | Support | Support | | 0.760 |
| 2 | MainPoint | Support | | 0.238 |
| 3 | Thesis | Support | | -0.028 |
| 4 | | Support | Support | 0.716 |
| 5 | | Support | MainPoint | 0.220 |
| 6 | | Support | Concl. | 0.047 |
| 7 | | Concl. | Concl. | 0.063 |
| 8 | | Concl. | EndOfEssay | -0.680 |

(56) References Cited

U.S. PATENT DOCUMENTS

| | | | |
|---|---|---|---|
| 2013/0103623 A1* | 4/2013 | Burstein | G06N 20/00 706/12 |
| 2015/0039294 A1* | 2/2015 | Howald | G06N 20/00 704/9 |
| 2015/0066836 A1* | 3/2015 | Midmore | G06N 5/022 706/56 |
| 2016/0350288 A1* | 12/2016 | Wick | G06F 40/242 |
| 2017/0069215 A1* | 3/2017 | Borofsky | G09B 7/04 |

OTHER PUBLICATIONS

Burstein, Jill, Marcu, Daniel, Knight, Kevin; Finding the Write Stuff: Automatic Identification of Discourse Structure in Student Essays; IEEE Intelligent Systems: Special Issue on Advances in Natural Language Processing, 18(1); pp. 32-39; 2003.

Feng, Vanessa Wei, Hirst, Graeme; Classifying Arguments by Scheme; Proceedings of the 49th Annual Meeting of the Association for Computational Linguistics; pp. 987-996; 2011.

Ghosh, Debanjan, Khanam, Aquila, Han, Yubo, Muresan, Smaranda; Coarse-Grained Argumentation Features for Scoring Persuasive Essays; Proceedings of the 54th Annual Meeting of the Association for Computational Linguistics; Berlin, Germany; pp. 549-554; Aug. 2016.

Ong, Nathan, Litman, Diane, Brusilovsky, Alexandra; Ontology-Based Argument Mining and Automatic Essay Scoring; Proceedings of the 1st Workshop on Argumentation Mining; pp. 24-28; Jun. 2014.

Persing, Isaac, Ng, Vincent; End-to-End Argumentation Mining in Student Essays; Proceedings of the 2016 Conference of the North American Chapter of the Association for Computational Linguistics: Human Language Technologies; pp. 1384-1394; Jun. 2016.

Song, Yi, Heilman, Michael, Beigman Klebanov, Beata, Deane, Paul; Applying Argumentation Schemes for Essay Scoring; Proceedings of the 1st Workshop on Argumentation Mining; Baltimore, MD; pp. 69-78; Jun. 2014.

Stab, Christian, Gurevych, Iryna; Identifying Argumentative Discourse Structures in Persuasive Essays; Proceedings of the 2014 Conference on Empirical Methods in Natural Language Processing (EMNLP); Doha, Qatar; pp. 46-56; Oct. 2014.

Walton, Douglas; Argumentative Schemes for Presumptive Reasoning; Lawrence Erlbaum: Mahwah, NJ; 1996.

Walton, Douglas, Reed, Christopher, Macagno, Fabrizio; Argumentation Schemes; Cambridge University Press; 2008.

* cited by examiner

FIG. 1

| | Discourse Transition Feature | | | Weight |
|---|---|---|---|---|
| | Previous | Current | Next | |
| 1 | Support | Support | | 0.760 |
| 2 | MainPoint | Support | | 0.238 |
| 3 | Thesis | Support | | -0.028 |
| 4 | | Support | Support | 0.716 |
| 5 | | Support | MainPoint | 0.220 |
| 6 | | Support | Concl. | 0.047 |
| 7 | | Concl. | Concl. | 0.063 |
| 8 | | Concl. | EndOfEssay | -0.680 |

| F.s. | #Features | Av. | Min. |
|---|---|---|---|
| No f.s. | ~200,000 | .706 | .686 |
| p0.05 | ~3,500 | .687 | .656 |
| p0.05_2pr | <500 | .702 | .678 |
| mi_5% | ~1,000 | .704 | .684 |

IDENTIFY A DISCOURSE SEGMENT OF THE ARGUMENT CRITIQUE WRITTEN ESSAY
510

↓

DETERMINE A POSITION OF EACH SENTENCE IN THE DISCOURSE SEGMENT OF THE ARGUMENT CRITIQUE WRITTEN ESSAY
520

↓

CLASSIFY SENTENCES OF THE A DISCOURSE SEGMENT OF THE ARGUMENT CRITIQUE WRITTEN ESSAY INTO DISCOURSE UNITS
530

↓

EVALUATE AN ARGUMENTATIVE CONTENT OF EACH SENTENCE IN THE DISCOURSE SEGMENT OF THE ARGUMENT CRITIQUE WRITTEN ESSAY
540

↓

ASSIGN AN ARGUMENTATIVE SCORE TO THE ARGUMENT CRITIQUE WRITTEN ESSAY BASED AT LEAST IN PART ON THE ARGUMENTATIVE CONTENT OF EACH SENTENCE IN THE DISCOURSE SEGMENT OF THE ARGUMENT CRITIQUE WRITTEN ESSAY
550

SYSTEMS AND METHODS FOR SCORING ARGUMENT CRITIQUE WRITTEN ESSAYS

CROSS-REFERENCE TO RELATED APPLICATIONS

This application claims priority to U.S. Provisional Application No. 62/453,762, filed Feb. 2, 2017, the entirety of which is herein incorporated by reference.

TECHNICAL FIELD

The technology described herein relates to automatic scoring of written tests, and more specifically to scoring an argument critique written essay.

BACKGROUND

Automatic identification of good arguments on a controversial topic has applications in civics and education. While in the civics context it might be acceptable to create separate models for identifying good arguments for each topic, in the context of automated scoring of students' writing there is a preference towards a universal, generic model that applies to all responses. However, good arguments for one topic are likely to be irrelevant for another topic. Therefore, current models do not represent a generic model for detecting good arguments. Specifically, the performance gap exists between topic-specific and generic models for identification of good arguments.

Critically evaluating arguments is a highly important skill in higher education and the workplace. Students are expected to demonstrate sound reasoning and to use relevant evidence to support their arguments. The concomitant increase in argumentative writing tasks, in both instructional and assessment contexts, results in a high demand for scoring. Automating the scoring of critical argumentative writing would help meet this demand.

To date, automated analysis of argumentative writing in the scoring context has concentrated on argument structure—namely, presence of claims and premises, and relationships between them. Structure does not account for the possibility that students might be presenting claims and supporting them with premises, yet these are not, in fact, good arguments in the context of the topic of discussion.

Annotation protocols for analyzing argument critiques in students' essays have been developed, drawing on the theory of argumentation schemes. According to this theory, different types of arguments invite specific types of critiques. For example, an argument from authority—According to X, Y is the case—avails critiques along the lines of whether X has the necessary knowledge and is an unbiased source of information about Y. A number of common schemes have been analyzed, such as arguments from policy prospective. For every scheme, potential critiques are identified using that scheme, and every sentence in an essay is annotated with label of the critique that it raises (and then referred to as "non-generic"), or "generic" if none. Models for classifying arguments by the scheme they realize have been previously developed.

In practical large-scale automated scoring contexts, new essay questions (prompts) are often introduced without rebuilding the scoring system, which is typically subject to a periodic release schedule. Therefore, the assumption that the system will have seen essays responding to each of the prompts it could encounter at deployment time is often unwarranted. Further, not only should a system be able to handle responses to an unseen prompt, it must do it gracefully, since a large disparity in the system's performance across different prompts might raise fairness concerns.

Present inventors therefore identified a need for a robust argument analysis system for essays. Such system needs to capture aspects of argument content in a fashion that would generalize across various essay topics.

SUMMARY

Methods and systems for scoring an argument critique written essay are described. Methods may include identifying a discourse segment of the argument critique written essay, determining a position of each sentence in the discourse segment, classifying sentences into discourse units, evaluating an argumentative content of each sentence, and assigning an argumentative score to the argument critique written essay based at least in part on the argumentative content of each sentence in the discourse segment of that essay.

Identifying a discourse segment of the argument critique written essay may include searching for sentences with positive features, positive features comprising modality, negation, and positive features with prompt elements. Determining a position of each sentence in the discourse segment may include defining a previous sentence role, a current sentence role, and a next sentence role. Discourse units classifying sentences may include a Thesis, a Background, a MainPoint, a Support, and a Conclusion. Evaluating an argumentative content of each sentence may involve, for each sentence, transforming discourse role features into transitional features. Assigning an argumentative score to the argument critique written essay may be based on applying a conditional mutual information criterion.

Methods and systems may also include training a scoring method using a first set of argument critique essays and a second set of argument critique essays. The first set of argument critique essays may be a same-topic set, and a second set of argument critique essays may be a cross-topic set. Training may include a use of a lexical model with a feature selection. Classification accuracy of the scoring algorithm for a not prompt-specific set of argument critique essays may be 0.75 or higher after training.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. These technical advantages include a more accurate assessment of argument critique written essays, lower cost and shorter time for scoring such essays, more objective scoring that is less dependent on idiosyncrasies of human scorers, and as a result, an ability to administer assessment testing based on argument critique written essays to a broader range of test-takers.

The details of one or more variations of the subject matter described herein are set forth in the accompanying drawings and the description below. Other features and advantages of the subject matter described herein will be apparent from the description and drawings, and from the claims.

DETAILED DESCRIPTION

Same-topic and cross-topic sets of college-level argument critique essays may be used. The first may be used to set the bar for the performance in the context where the training and the testing essays respond to the same prompt. The second may be the main dataset focused on cross-prompt generalization. An annotation protocol may be adapted as needed to cover additional argumentation schemes. The average inter-annotator agreement on the "generic" vs "non-generic" sentence-level classification may be k=0.67.

For a same-topic set, a total of 900 essays may be annotated, 300 essays may be annotated for each of 3 prompts. For each prompt, a model may be trained on 260 responses and tested on 40 responses. The training sets per prompt may contain on average 2,700 sentences, of which 38% may be classified as containing good argument critiques.

For an across-topics set, a total of 500 essays may be annotated, 50 essays for each of 10 prompts. A 10-fold cross validation may be performed, training on 9 prompts and testing on the 10th, modeling a scenario of generalization to an unknown topic. There may be, on average, 5,492 sentences available for training, of which 3,917 (42%) may be classified as containing good critiques.

Figure 1:
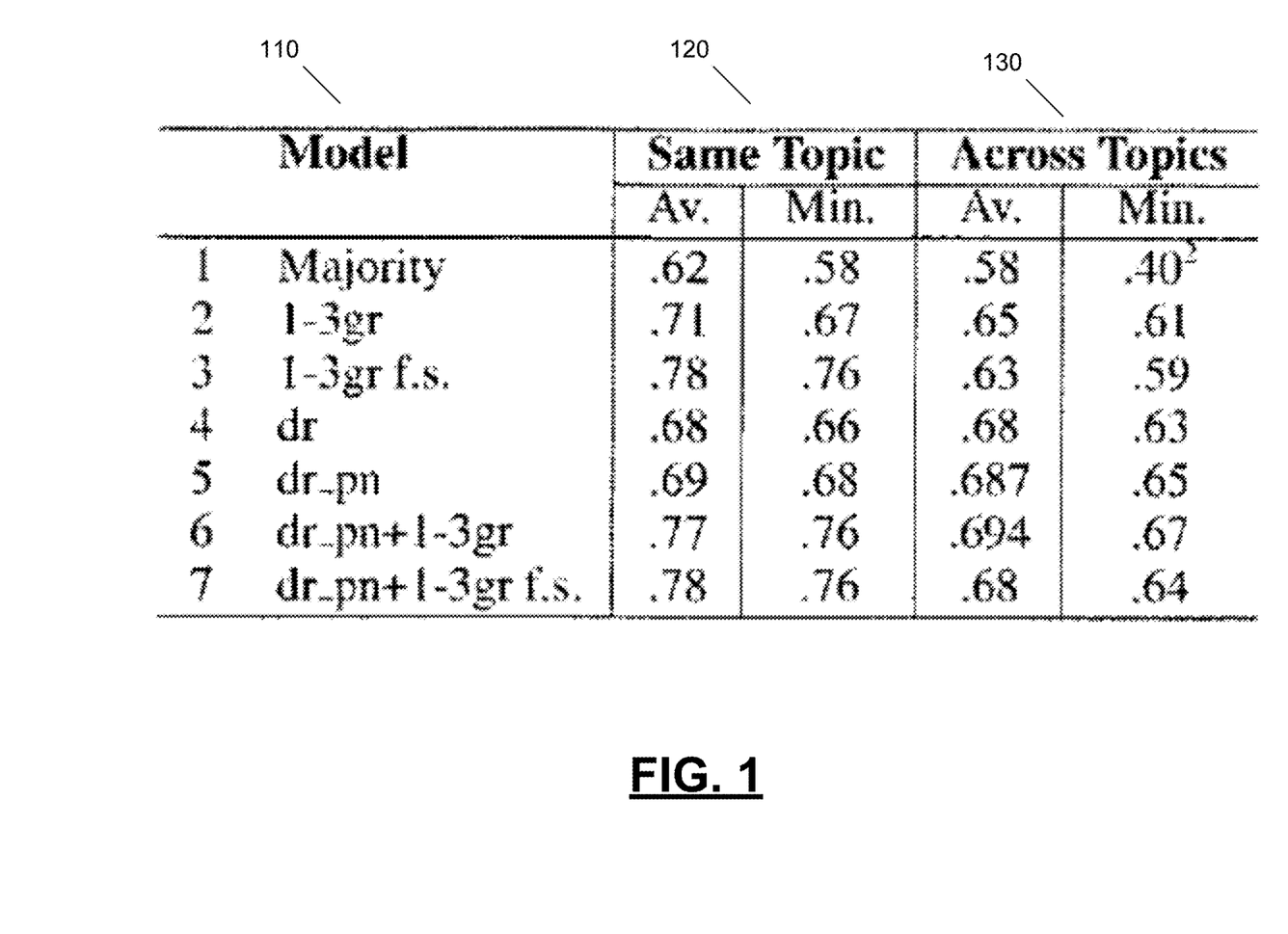
FIG. 1 is an example of classification accuracies for generic vs non-generic sentences, according to an embodiment.

FIG. 1 illustrates results according to one embodiment. FIG. 1 shows a list of models 110. For each model, results may include classification accuracies for the same-topic set (120) and for the across-topics set (130). Both average performance ("Av.") and minimum performance ("Min.") may be presented.

Given that making a good critique is presumably may be mostly about saying the right things, lexical models may be expected to perform well in same-topic context and badly in the cross-topic one. 1-3 grams, 1-4 grams, and 1-5 grams models learned using logistic regression classifier may be evaluated. Differences in performance tend to be in the third or fourth decimal digit. Therefore, results for 1-3 grams only may be reported. Classification accuracies for one embodiment are shown in row 2 of FIG. 1, following the majority baseline (row 1), in both same-topic and across topics scenarios. FIG. 1 shows average performance (Av) in column 120 as well as the worst performance (Min) on 3 prompts (same-topic) and on 10 prompts (across topics) in column 130. Models built using chi-square based feature selection (f.s.) may be also evaluated, eliminating all features with p value above 0.05 (row 3 in FIG. 1).

For the same-topic context, lexical features may boost performance from 0.62 to 0.71; selecting the most informative features may further increases performance up to 0.78 and may bring the minimum close to the average performance (0.76), suggesting that the selection mechanism with ngram features may produces fairly good and robust results. In contrast, lexical features may be much less effective across topics; feature selection reduces performance. In all, substantial gaps of 13 (0.78 vs 0.65) and 15 (0.76 vs 0.61) accuracy points may be observed, for average and worst case, respectively, between same-topic and across-topics scenarios for ngram models.

An approach that may be more aligned with the across-topic setting would be to notice that in detailing one's arguments, one that may utilize a specially structured discourse, and that discourse role could provide a clue to the argumentative function of a sentence, without reliance on what the sentence is actually saying (beyond discourse connectives that may be used to help identify the discourse role). In particular, argumentative essays often may have a fairly standard structure, where a general claim (or stance, or thesis) on the issue may be introduced in the beginning of the essay, It may be followed by a sequence of main points, each elaborated using supporting statements. It may finally be followed by a conclusion that often re-states the thesis and provides a high-level summary of the argument. The "meat" of the argument may be expected to occur mostly in the supporting statements that provide detailed exposition of the author's arguments. A state-of-art discourse parser for argumentative essays may be used to classify sentences into the following discourse units: Thesis, Background, Main-Point, Support, Conclusion, and Other. Row 4 (dr) in FIG. 1 shows the performance of a set of 6 binary features according to one embodiment. Of the 6 features, Support and MainPoint may have a positive weight (predict "non-generic"), while the rest may predict "generic." The majority baseline for one prompt may be below 50% because for that prompt the majority class may be actually sentences that raise appropriate arguments, differently from the other 9 prompts.

The position of a sentence inside a discourse segment might also provide some information. A sentence surrounded by Support sentences may likely to be in the middle of exposition of an argument, as opposed to the last Supporting sentence before the next Main Point that could be summary-like, leading up to a shift to a new topic. Two sets of transition features may be built, one for all pairs of <previous_sentence_role, current_sentence_role> (such as <Thesis, Main Point> for a sentence that is classified as Main Point and follows a thesis sentence), and the other— for all pairs of <current_sentence_role, next_sentence_role>. Discourse tags BeginningOfEssay and EndOfEssay may be added to handle the first and the last sentences of the essay.

Figure 2:
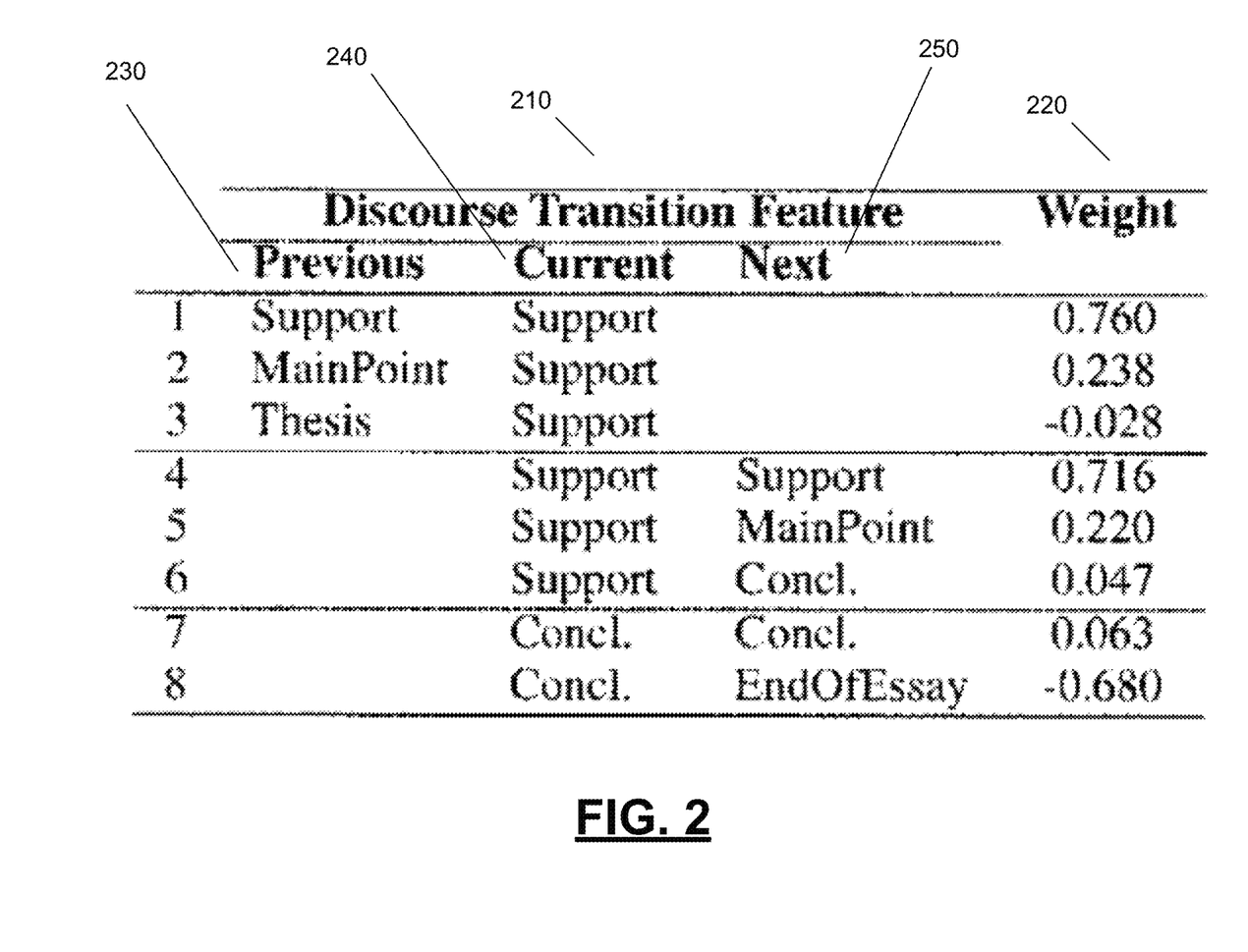
FIG. 2 is an example of weights of the transition features, according to an embodiment.

FIG. 2 shows the weights of transition features according to one embodiment. Discourse Transition Features 210 include Previous (230), Current (240, and Next (250) features. Their weight 220 is reported in the last column of FIG. 2.

The likelihood of the current Support sentence to carry argumentative content may be higher if it follows another Support sentence (row 1 in FIG. 2) than if it follows a Main Point (row 2 in FIG. 2); if the Support sentence follows Thesis, it is actually not likely to contain argumentative content (perhaps it is more like a Main Point sentence than like a typical Support). Likewise, being followed by another Support sentence may be a good sign (row 4 in FIG. 2), but being the last Support sentence before transitioning to a new Main Point may have a much lower positive weight (row 5 in FIG. 2), and being the last Support before Conclusion may have a still lower positive weight (row 6 in FIG. 2). Interestingly, while being the last Conclusion sentence in the essay may strongly predict "generic" (row 8 in FIG. 2), if the next sentence is still within a Conclusion segment, the prediction may be actually slightly positive (row 7 in FIG. 2), suggesting that some authors may rehash arguments in substantial detail in concluding remarks, warranting a "non-generic" designation.

FIG. 1 shows the performance of the discourse role features (dr), the transition pairs using previous and next discourse roles (dr_pn), and the combination of content and discourse (rows 6, 7 of FIG. 1). Since argument critiques may often span more than one sentence. Sequence labeling using Conditional Random Fields was also evaluated, but performance may be not better than with logistic regression.

Transforming the discourse role features into transitional features may be effective, both for average and for worst-case performance. The discourse role features may be clearly inferior to the content features for the same-topic context (0.69 in row 5 in FIG. 1 vs 0.78 in row 3 in FIG. 1), while the opposite may be true for the across-topics scenario (0.687 in row 5 in FIG. 1 vs 0.65 in row 2 in FIG. 1). While adding content features to discourse features may be effective across topics (rows 5 in FIG. 1 vs 6 in FIG. 1), there may be no improvement when adding discourse features on top of the content features in the same-topic context with feature selection (compare rows 3 and 7 in FIG. 1).

To better understand this latter finding, the 1-3 gram f.s. feature set may be inspected in the same-context scenario. Some of the ngrams clearly may be prompt-specific (such as other tourist attractions, natural predators, or sample size), yet many may not: in conclusion, conclusion of the, for example, furthermore, support the claim, author argues. It appears that these lexical signals of discourse structure may be sufficiently strong so that the more abstract classification such as discourse role of the sentence may be not adding information.

Discourse structure information can result in larger improvement in the across-topics scenario, compared to the lexical information on its own. Combining the two types of information may further improve performance in across-task scenario, and may reduce the gap between across-topic and same-topic contexts from 13 points on average for lexical features to 9 points on average (0.78 vs 0.69) and in worse case (0.76 vs 0.67), for a combined discourse structure and content model.

In an attempt to further improve across-topics performance, ngrams representations and adapted feature selection may be generalized to reflect the across-prompt generalization dynamic more directly.

Figure 3:
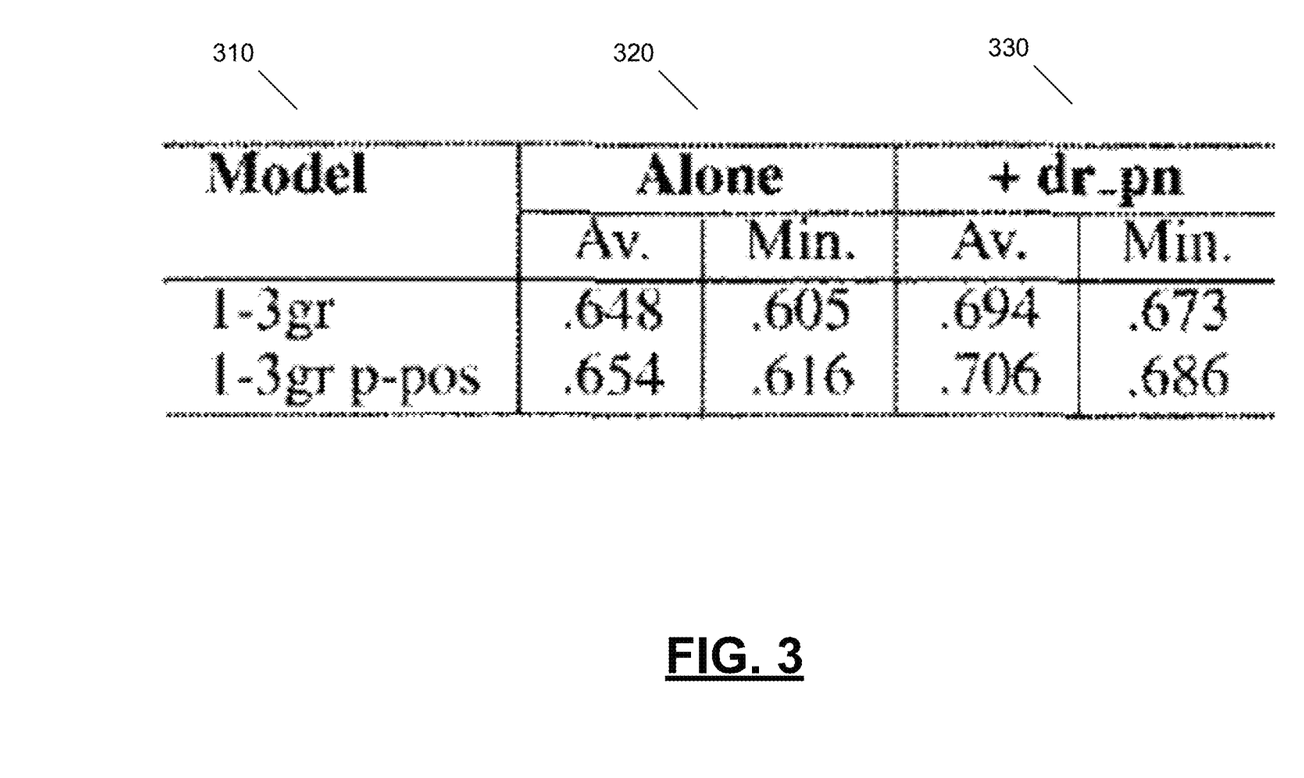
FIG. 3 is an example of accuracies for generalized ngram features, according to an embodiment.

Suppose the prompt is arguing that some entity N should do some action V. While N and V might differ across prompts, critical sentences to the end that N should not do V may likely occur across different prompts. In the current ngrams representation, N and V may differ across prompts, and may be unknown for a prompt that is unseen during training. All content words (nouns, verbs, adjectives, adverbs, and cardinal numbers) in the prompt may be represented as their part-of-speech labels; it should be possible to capture features such as "should not VB." FIG. 3 shows the result (1-3 gram p-pos model): the model may improve on the vanilla ngrams in both the average and the worst cases, on its own and on top of the discourse structure features. In FIG. 3, models 310 may be listed with corresponding results, which may include results for models alone (320) and with dr_pn (330).

The single strongest lexical predictor of a generic sentence may be the first person singular pronoun I; such sentences may likely express stance (I think this is a good plan), or may contain discourse management expressions such as I will show that the author's arguments are flawed. Words such as assumptions, evidence, information, argument, statistics, idea, reasons may all have negative weight, suggesting that they may typically belong to generic sentences such as The author's argument lacks evidence that does not raise a specific critique. Lexical features for the positive class include modality as in might, perhaps, could, possible that, potential, necessarily, if a; negation (not, will not), as well as more specific lexica that may point out, for example, outcomes of a policy (expensive, increase in, affected the, fails to). Positive features with prompt elements may include NNS does not, NN do not, many NNS, NN NNS are, NNS who VBD, could have VBN, will not VB.

Three feature selection methods may be compared: (1) Features with $p<0.05$ using a chi-squared test (p0.05); (2) Features with $p<0.05$ for at least two out of the 9 training prompts in order to select features that are likely to generalize across prompts (p0.05_2pr); (3) Features based on their mutual information with the label conditioned on values of the dr_pn features, in order to encourage selection of features that augment, rather than repeat, the discourse information. Features in the top 5% based on this metric (mi_5%) may be selected.

Figure 4:
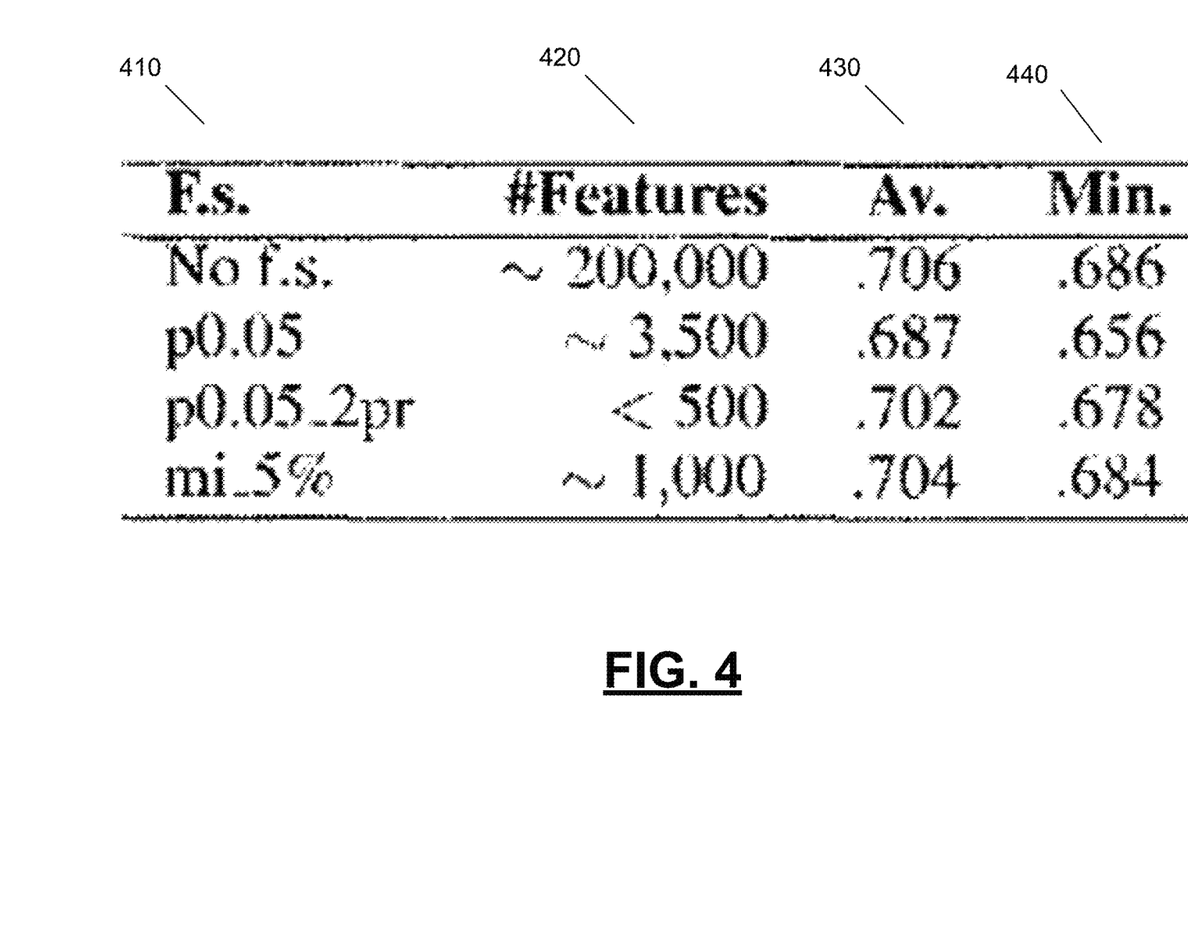
FIG. 4 is an example of performance of feature selection, according to an embodiment.

FIG. 4 shows the results of this comparison, according to one embodiment. FIG. 4 illustrates results for several feature selection approaches 410. Results may include number of features 420, average classification accuracies 430, and minimum classification accuracies 440. The p0.05 mechanism may be not effective. The p0.05_2pr selection may be better, but may reduce worst-case accuracy by almost a point. The mi_5% mechanism may preserve performance within 0.002 of the versions without feature selection while reducing the number of features by two orders of magnitude.

Experiments on classifying sentences in an essay as containing good argument critiques or not may be conducted. While a good argument is a matter of content, it may be possible to build classifiers that are not prompt-specific, using a combination of discourse structure features and generalized lexical features that take into account reference to the text of the question (prompt) to which the author is responding. Starting from a ngrams baseline where the performance gap between same-prompt and across-prompts scenarios is 13 accuracy points on average (0.78 vs 0.65) and 15 points in worst case (0.76 vs 0.61), the features above may successfully close half the gap, bringing the across-prompts performance to 0.71 on average and 0.69 in the worst case. This performance may be preserved with only about 0.5% of the features, using a conditional mutual information criterion. The improvement in worst case performance may be important for ensuring that the system does not exhibit large performance differences across different essay prompts used on the same test.

Figure 5:
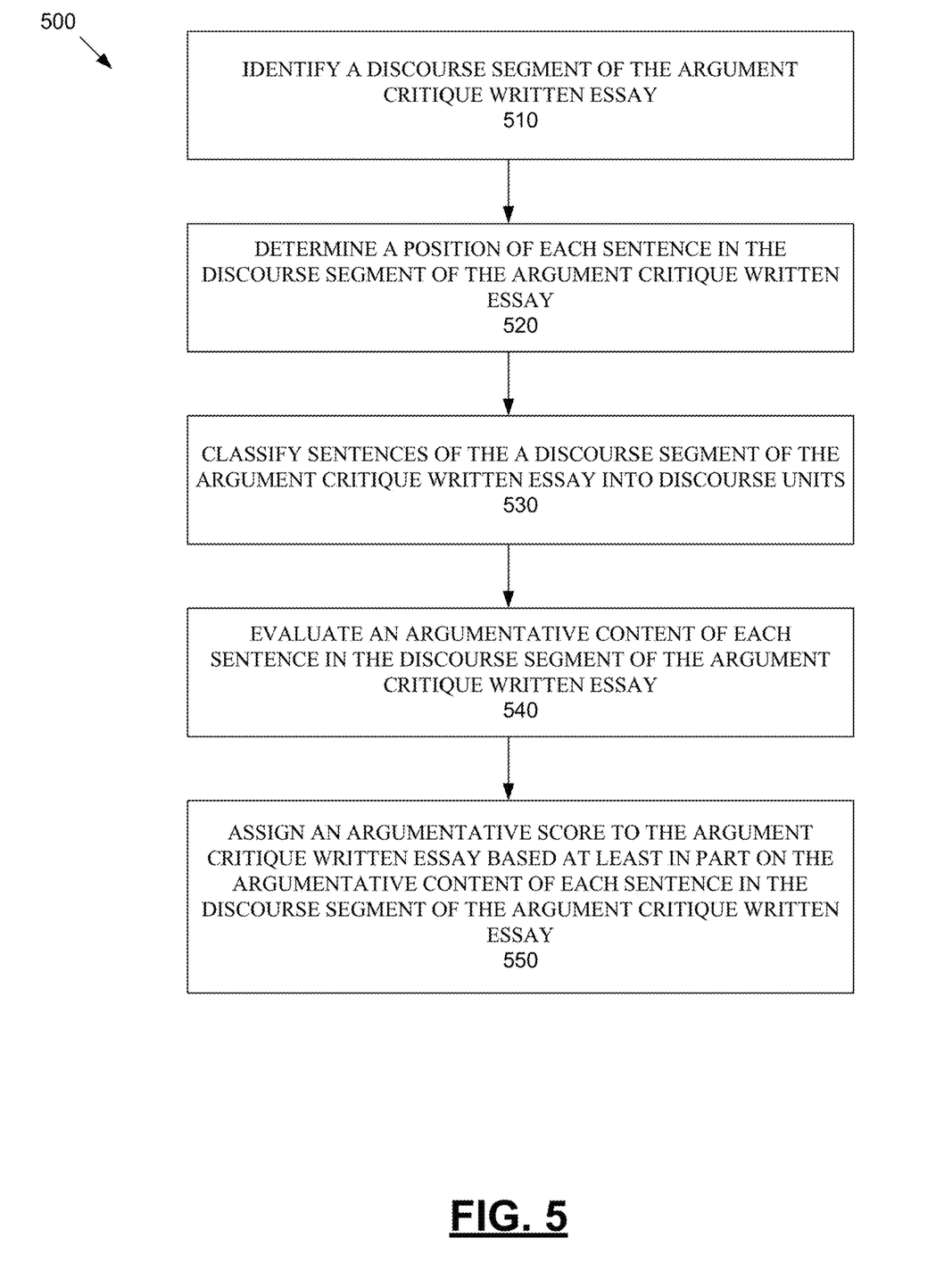
FIG. 5 is a diagram illustrating an exemplary method according to an embodiment.

FIG. 5 illustrates a method 500 for scoring an argument critique written essay according to one embodiment. In step 510, method identifies a discourse segment of the argument critique written essay. In step 520, method determines a position of each sentence in the discourse segment of the argument critique written essay. In step 530, method classifies sentences of the a discourse segment of the argument critique written essay into discourse units. In step 540, method evaluates an argumentative content of each sentence in the discourse segment of the argument critique written essay. In step 550, method assigns an argumentative score to the argument critique written essay based at least in part on the argumentative content of each sentence in the discourse segment of the argument critique written essay.

Figure 6A:
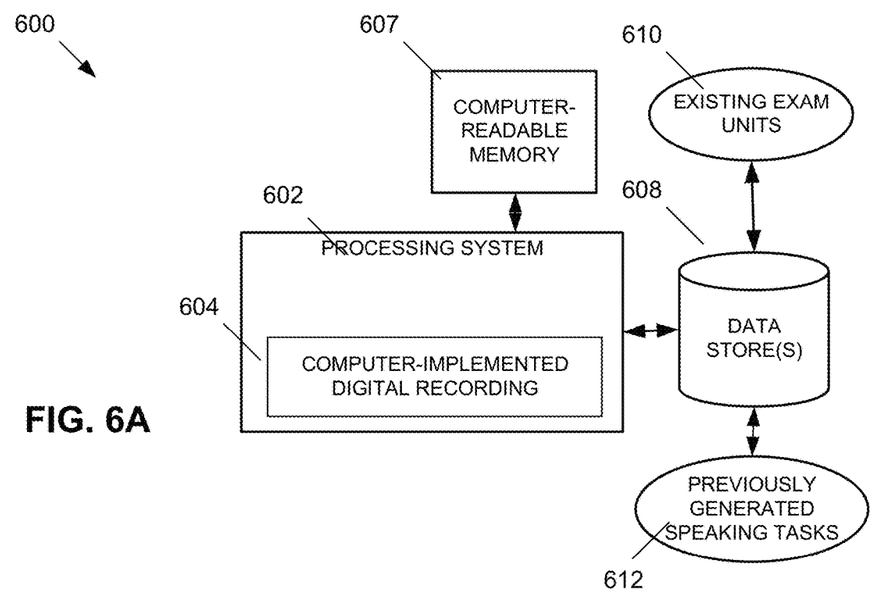
FIGS. 6A, 6B, and 6C depict example systems for implementing the approaches described herein for scoring an argument critique written essay.
Figure 6B:
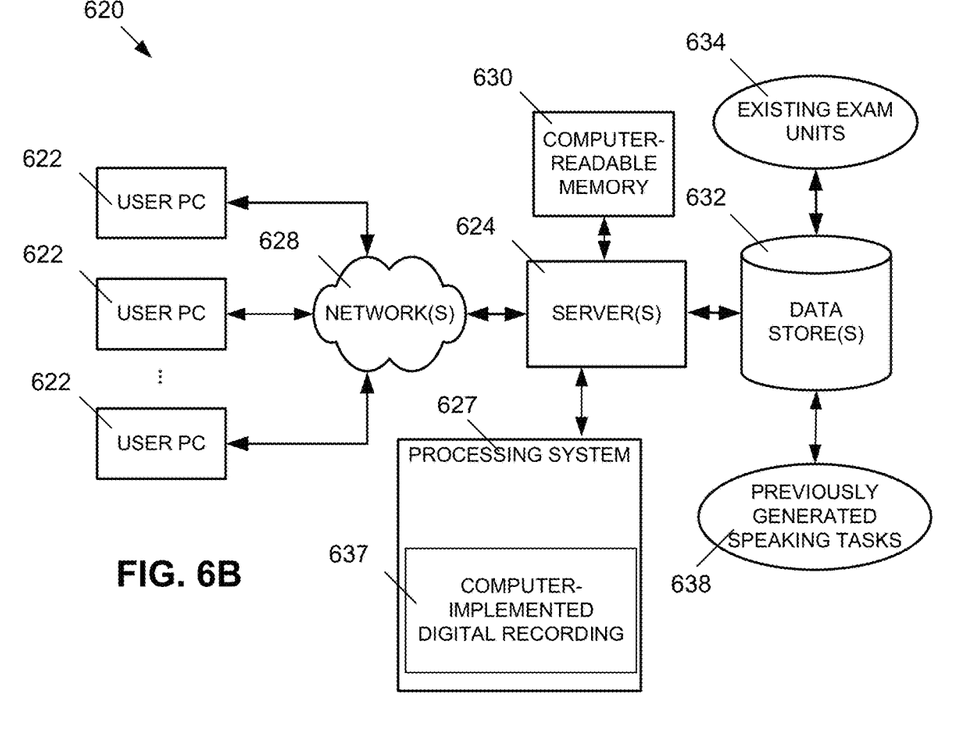
Figure 6C:
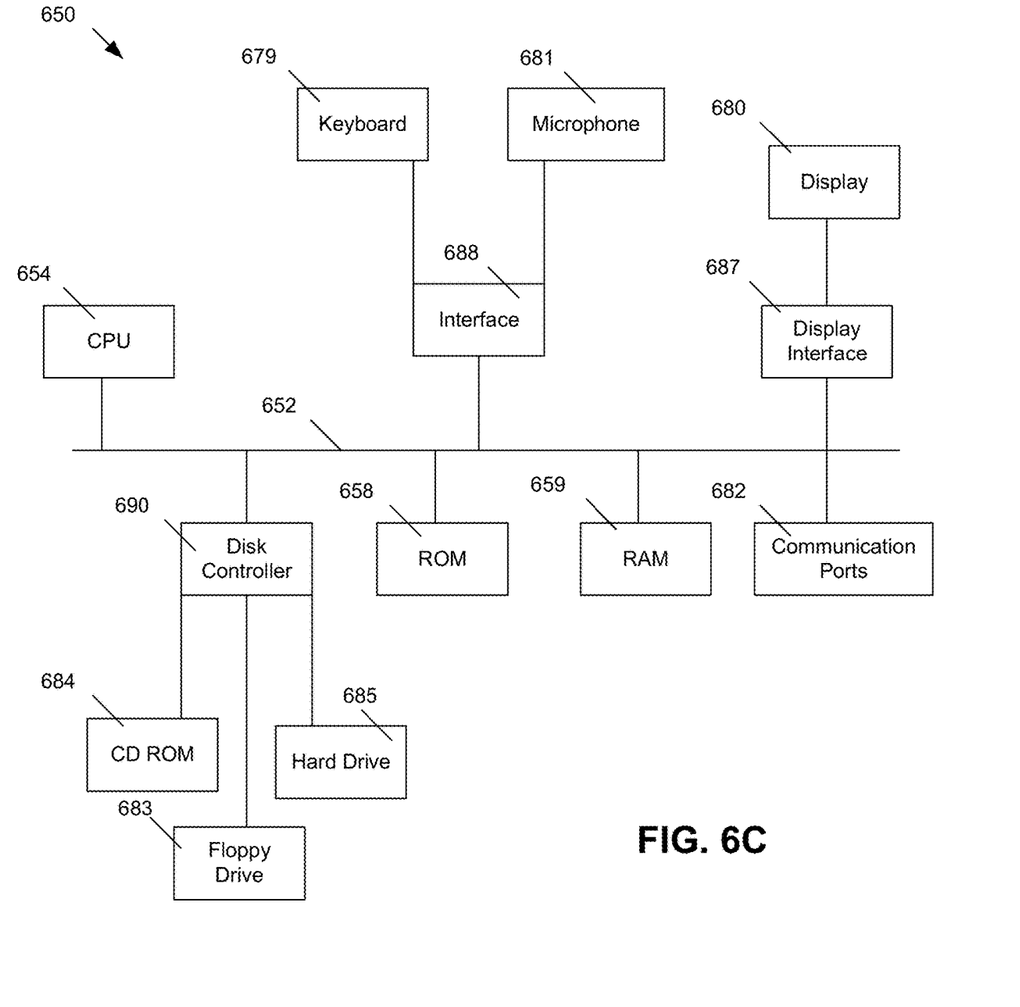

FIGS. 6A, 6B, and 6C depict example systems for implementing the approaches described herein for scoring an argument critique written essay. For example, FIG. 6A depicts an exemplary system 600 that includes a standalone computer architecture where a processing system 602 (e.g., one or more computer processors located in a given computer or in multiple computers that may be separate and distinct from one another) includes a computer-implemented digital recording 604 being executed on the processing system 602. The processing system 602 has access to a computer-readable memory 607 in addition to one or more data stores 608. The one or more data stores 608 may include existing exam units 610 as well as previously generated speaking tasks 612. The processing system 602 may be a distributed parallel computing environment, which may be used to handle very large-scale data sets.

FIG. 6B depicts a system 620 that includes a client-server architecture. One or more user PCs 622 access one or more servers 624 running an appropriate-level digital recording 637 on a processing system 627 via one or more networks 628. The one or more servers 624 may access a computer-readable memory 630 as well as one or more data stores 632. The one or more data stores 632 may include existing exam units 634 as well as previously generated speaking tasks 638.

FIG. 6C shows a block diagram of exemplary hardware for a standalone computer architecture 650, such as the architecture depicted in FIG. 6A that may be used to include and/or implement the program instructions of system embodiments of the present disclosure. A bus 652 may serve as the information highway interconnecting the other illustrated components of the hardware. A processing system 654 labeled CPU (central processing unit) (e.g., one or more computer processors at a given computer or at multiple computers), may perform calculations and logic operations required to execute a program. A non-transitory processor-readable storage medium, such as read only memory (ROM) 658 and random access memory (RAM) 659, may be in communication with the processing system 654 and may include one or more programming instructions for performing the method of automatically generating texts appropriate for a reading level of an individual. Optionally, program instructions may be stored on a non-transitory computer-readable storage medium such as a magnetic disk, optical disk, recordable memory device, flash memory, or other physical storage medium.

In FIGS. 6A, 6B, and 6C, computer readable memories 607, 630, 658, 659 or data stores 608, 632, 683, 684, 688 may include one or more data structures for storing and associating various data used in the example systems for automatically generating texts appropriate for a reading level of an individual. For example, a data structure stored in any of the aforementioned locations may be used to store data from XML files, initial parameters, and/or data for other variables described herein. A disk controller 690 interfaces one or more optional disk drives to the system bus 652. These disk drives may be external or internal floppy disk drives such as 683, external or internal CD-ROM, CD-R, CD-RW or DVD drives such as 684, or external or internal hard drives 685. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 690, the ROM 658 and/or the RAM 659. The processor 654 may access one or more components as required.

A display interface 687 may permit information from the bus 652 to be displayed on a display 680 in audio, graphic, or alphanumeric format. Communication with external devices may optionally occur using various communication ports 682.

In addition to these computer-type components, the hardware may also include data input devices, such as a keyboard 679, or other input device 681, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended It is claimed:

1. A processor implemented method for scoring an argument critique written essay, the method comprising:
   identifying a discourse segment of the argument critique written essay;
   determining a discourse role of each sentence in the discourse segment of the argument critique written essay;
   classifying sentences of the a discourse segment of the argument critique written essay into discourse units;
   applying an annotation protocol to annotate argument schemes in the discourse segment of the argument critique written essay;
   evaluating an argumentative content of each sentence in the discourse segment of the argument critique written essay based on annotated argument schemes;
   selecting features using a chi-squared test; and
   assigning an argumentative score to the argument critique written essay based at least in part on the argumentative content of each sentence in the discourse segment of the argument critique written essay and at least in part based on selected features.

2. The method of claim 1, wherein the identifying comprises searching for sentences with positive features, positive features comprising modality, negation, and positive features with prompt elements.

3. The method of claim 2, wherein the determining comprises defining a previous sentence role, a current sentence role, and a next sentence role.

4. The method of claim 3, wherein the discourse units comprise a Thesis, a Background, a MainPoint, a Support, and a Conclusion.

5. The method of claim 4, wherein the evaluating comprises, for each sentence, using the annotation protocol to transform discourse role features into transitional features.

6. The method of claim 5, wherein the assigning comprises applying a conditional mutual information criterion.

7. The method of claim 1, wherein the method further comprises, before identifying, training a scoring method using a first set of argument critique essays and a second set of argument critique essays.

8. The method of claim 7, wherein selecting comprises selecting features with $p<0.05$ for at least two training essay prompts.

9. The method of claim 8, wherein the training comprises use of a 1-3 gram lexical model with a feature selection.

10. The method of claim 9, wherein a scoring algorithm with less than 500 features for a not prompt-specific set of argument critique essays has an average classification accuracy of at least 0.7 after training and a minimum classification accuracy of at least 0.65 after training.

11. A system for scoring an argument critique written essay, comprising:
   a memory for storing the argument critique written essay; and
   a processor for:
   identifying a discourse segment of the argument critique written essay;
   determining a discourse role of each sentence in the discourse segment of the argument critique written essay;
   classifying sentences of the a discourse segment of the argument critique written essay into discourse units;
   applying an annotation protocol to annotate argument schemes in the discourse segment of the argument critique written essay;
   evaluating an argumentative content of each sentence in the discourse segment of the argument critique written essay based on annotated argument schemes;
   selecting features using a chi-squared test; and
   assigning an argumentative score to the argument critique written essay based at least in part on the argumentative content of each sentence in the discourse segment of the argument critique written essay and at least in part based on selected features.

12. The system of claim 11, wherein the identifying comprises searching for sentences with positive features, positive features comprising modality, negation, and positive features with prompt elements.

13. The system of claim 12, wherein the determining comprises defining a previous sentence role, a current sentence role, and a next sentence role.

14. The system of claim 13, wherein the discourse units comprise a Thesis, a Background, a MainPoint, a Support, and a Conclusion.

15. The system of claim 14, wherein the evaluating comprises, for each sentence, using the annotation protocol to transform discourse role features into transitional features.

16. The system of claim 15, wherein the assigning comprises applying a conditional mutual information criterion.

17. The system of claim 11, wherein the method further comprises, before identifying, training a scoring method using a first set of argument critique essays and a second set of argument critique essays.

18. The system of claim 17, wherein selecting comprises selecting features with $p<0.05$ for at least two training essay prompts.

19. The system of claim 18, wherein the training comprises use of a 1-3 gram lexical model with a feature selection.

20. The system of claim 19, wherein a scoring algorithm with less than 500 features for a not prompt-specific set of argument critique essays has an average classification accuracy of is at least 0.7 after training and a minimum classification accuracy of at least 0.65 after training.

* * * * *